United States Patent
Ait Aoudia et al.

(10) Patent No.: US 11,949,484 B2
(45) Date of Patent: Apr. 2, 2024

(54) SIGNAL DEMAPPING

(71) Applicant: Nokia Technologies OY, Espoo (FI)

(72) Inventors: Faycal Ait Aoudia, Saint-Cloud (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 17/628,372

(22) PCT Filed: Sep. 3, 2019

(86) PCT No.: PCT/EP2019/073497
§ 371 (c)(1),
(2) Date: Jan. 19, 2022

(87) PCT Pub. No.: WO2021/043390
PCT Pub. Date: Mar. 11, 2021

(65) Prior Publication Data
US 2022/0286181 A1    Sep. 8, 2022

(51) Int. Cl.
*H04B 7/06* (2006.01)
*G06N 3/08* (2023.01)

(52) U.S. Cl.
CPC ............ *H04B 7/0639* (2013.01); *G06N 3/08* (2013.01); *H04B 7/0663* (2013.01)

(58) Field of Classification Search
CPC .......... H04B 3/00; H04B 5/00; H04B 1/0003; H04B 1/06; H04B 17/00; H04B 7/0639;
(Continued)

(56) References Cited

U.S. PATENT DOCUMENTS

2020/0052820 A1* 2/2020 Chen ................. H04J 99/00
2022/0217035 A1* 7/2022 Melodia ............. G06N 3/063

FOREIGN PATENT DOCUMENTS

EP          2343837 A1    7/2011
WO   WO-2020064093 A1 * 4/2020 .......... G06N 3/0454

OTHER PUBLICATIONS

Bin Le et al., "Modulation Identification Using Neural Networks for Cognitive Radios", Jan. 1, 2005, XP055689907.
(Continued)

*Primary Examiner* — Jean B Corrielus
(74) *Attorney, Agent, or Firm* — Harness, Dickey & Pierce, P.L.C.

(57) ABSTRACT

In one embodiment, a trainable logic includes determination logic configured to determine a plurality of available receiver configurations and associate each receiver configuration with a context matrix; codebook logic configured to select a quantisation codebook to be used by the trainable logic for the context matrices; and learning logic configured to learn from a training dataset including a plurality of received signal samples relevant to reconstruction of a transmitted message. The learning logic is configured to generate, from the training dataset, a set of superposed parameters and context matrices corresponding to the plurality of available receiver configurations and a set of contextual parameters for each context; quantize the context matrices according to the quantisation codebook; and repeat the generation of superposed parameters, context matrices and quantization of context matrices until a stop criterion is met.

20 Claims, 3 Drawing Sheets

(58) Field of Classification Search
CPC .......... H04B 7/0663; G06N 3/08; G06N 3/02; G06N 20/00; G06N 3/045; G06N 3/063
See application file for complete search history.

(56) References Cited

OTHER PUBLICATIONS

Brian Cheung et al., "Superposition of Many Models Into One", Feb. 14, 2019, XP081369698.
International Search Report and Written Opinion for International Application No. PCT/EP2018/073497 dated May 8, 2020.

\* cited by examiner

SIGNAL DEMAPPING

CROSS-REFERENCE TO RELATED APPLICATIONS

This application is a national phase under 35 U.S.C. § 371 of PCT International Application No. PCT/EP2019/073497 which has an International filing date of Sep. 3, 2019, the entire contents of each of which are hereby incorporated by reference.

TECHNOLOGICAL FIELD

Various example embodiments relate to a method and apparatus which can be used to assist with selection of one of a plurality of available receiver configurations to demap a received signal at a receiver in a wireless communication network.

BACKGROUND

Neural networks (NNs) can be used in communications systems to improve system performance. For example, a receiver or transceiver within a communication network, a neural network may be trained in relation to input parameters such that, for a given system configuration, the neural network selects a desirable mode of operation (output parameter).

Neural networks configured to make decisions or identify outcomes based on a set of input samples often perform well. One of the reasons for the success of NNs is their ability to generalize well when confronted to samples not seen at training but drawn from a distribution from which a training dataset was sampled.

One drawback of NNs is their lack of configurability once trained. In particular, a NN trained for a specific task will typically perform poorly on a different task, even if the two tasks are similar (for example, two different computer vision tasks).

In the case of a neural network used in implementing a communication receiver, it is desirable that a receiver works well for various settings, for example, different modulation schemes and/or different channel conditions. Ensuring that a receiver works well across such settings typically requires that multiple NNs are trained and implemented. Training dedicated NNs for each possible system configuration, for example, one for each modulation scheme, such as BSPK, QPSK, 16QAM, 64QAM, is straight-forward, but leads to a significant increase in hardware resources required to implement those dedicated NNs. The increased hardware resources may include, for example: memory, surface on a field-programmable gate array (FPGA) and so on. Such increased hardware requirements might render an approach requiring multiple NNs undesirable in practice.

Aspects and embodiments relate to receiver algorithms with trainable parameters implemented by logic in communication systems, such as logic including, for example, neural networks (NNs). Aspects and embodiments relate to efficient implementation of such receiver algorithms in practical systems.

BRIEF SUMMARY

The scope of protection sought for various embodiments of the invention is set out by the independent claims. The embodiments, examples, arrangements and features, if any, described in this specification that do not fall under the scope of the independent claims are to be interpreted as examples useful for understanding various embodiments of the invention.

According to various, but not necessarily all, embodiments of the invention there is provided an apparatus comprising: trainable logic configured to quantize a plurality of receiver configurations said trainable logic comprising: determination logic configured to determine a plurality of available receiver configurations and associate each receiver configuration with a context matrix; codebook logic configured to select a quantisation codebook to be used by the trainable logic for the context matrices; learning logic configured to learn from a training dataset comprising a plurality of received signal samples relevant to reconstruction of a transmitted message; said training logic being configured to generate from the training dataset: a set of superposed parameters and context matrices corresponding to the plurality of available receiver configurations and a set of contextual parameters for each context, the contextual parameters being generatable from the superposed parameters by combination with the context matrix associated with each receiver configuration; quantize the context matrices according to the quantisation codebook; and repeat the generation of superposed parameters, context matrices and quantization of context matrices until a stop criterion is met.

The apparatus may be such that the stopping criterion comprises one or more of: a predefined number of iterations; meeting a predetermined performance metric.

The apparatus may be such that the stopping criterion relates to a performance metric associated with the reconstruction of the transmitted message. Such performance metrics may include, for example, a selected symbol error rate.

The apparatus may be such that the stopping criterion relates to a performance metric associated with quantizing the context matrices according to the quantisation codebook.

The apparatus may be such that selecting the quantisation codebook comprises: setting coefficients of the context matrices to match values of a finite matrix codebook.

The apparatus may be such that the finite matrix codebook comprises one of: $\{-1, 0, 1\}$; values which are powers of two.

The apparatus may be such that the combination of superposed parameters with the context matrix comprises one of: matrix multiplication or element-wise product.

The apparatus may be such that the receiver configurations comprise one or more of: a receiver or demodulation configuration.

According to various, but not necessarily all, embodiments of the invention there is provided a device comprising: reception logic configured to receive a wireless communication signal; processing logic configured to process the received wireless communication signal and demap the received signal, said processing logic comprising: a receiver control module including apparatus as described above.

The device may be such that it further comprises: receiver configuration selection logic configured to select a receiver configuration from said plurality of receiver configurations to apply to said received wireless communication system, based upon one or more factors including: said generated superposed parameters and quantized context matrices.

According to various, but not necessarily all, embodiments of the invention there is provided a method comprising: quantising a plurality of receiver configurations by: determining a plurality of available receiver configurations and associating each receiver configuration with a context matrix; selecting a quantisation codebook to be used for the context matrices; providing a training dataset comprising a plurality of received signal samples relevant to reconstruction of a transmitted message; generating from the training dataset: a set of superposed parameters and context matrices corresponding to the plurality of available receiver configurations and a set of contextual parameters for each context, the contextual parameters being generatable from the superposed parameters by combination with the context matrix associated with each receiver configuration; and quantizing the context matrices according to the quantisation codebook; repeating the generating of superposed parameters, context matrices and quantisation of until a stop criterion is met.

According to various, but not necessarily all, embodiments of the invention there is provided a computer program product configured to perform the method described above when executed on a computer.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 1b illustrates schematically a typical outline of a neural network used for.

Figure 3:
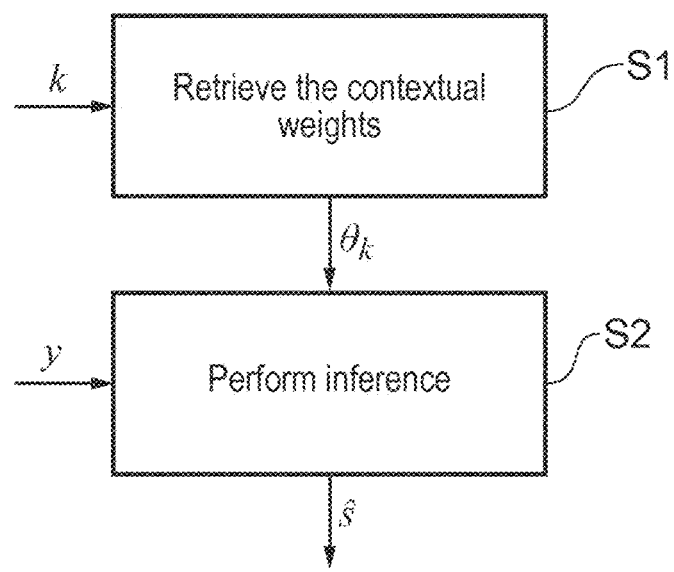

FIG. 3 comprises a visual representation of an inference flow-graph; and

Figure 4:
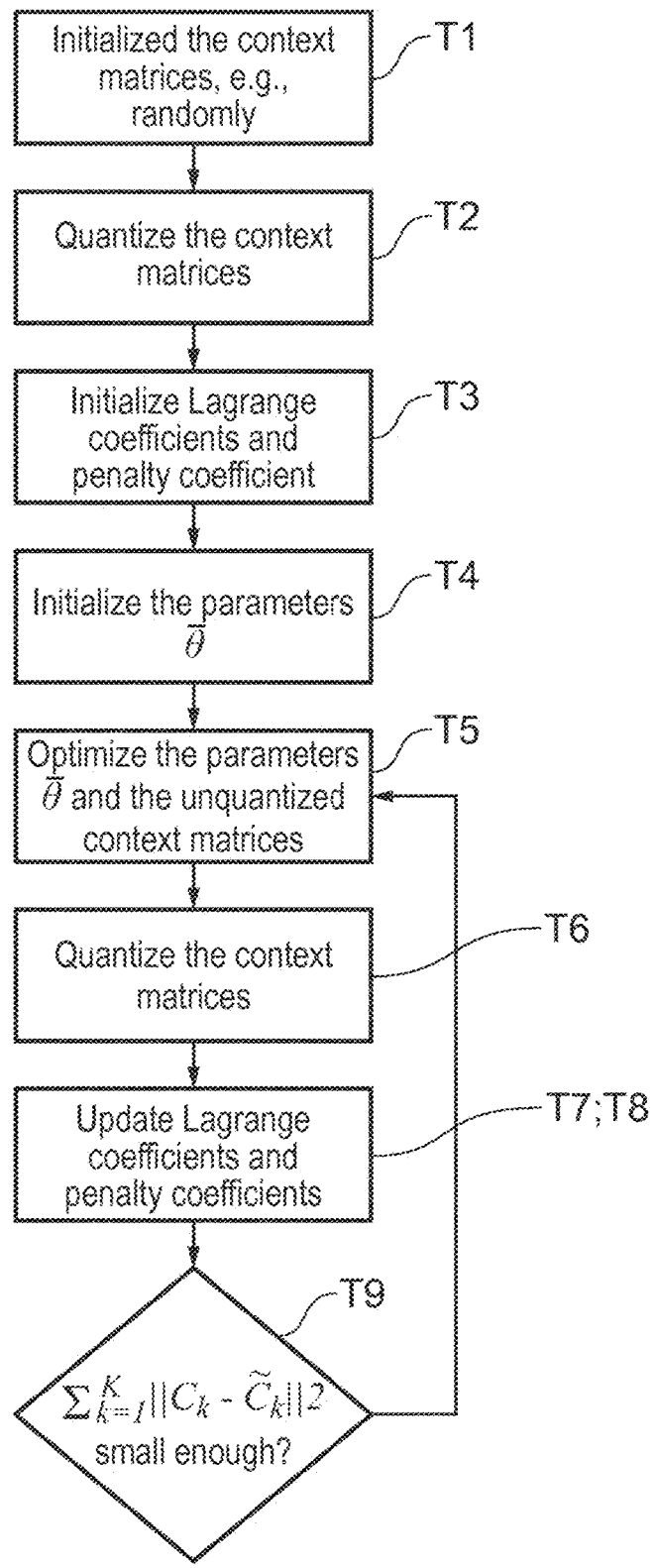

FIG. 4 comprises a flow-graph of a training procedure according to an arrangement.

DETAILED DESCRIPTION

Before discussing the example embodiments in any more detail, first an overview will be provided.

Modulation and demodulation of a wireless signal is a fundamental module of any wireless communication system. Typically, a receiver/demodulation/demapping apparatus within a communication system is configured to operate to receive and demap a signal by taking factors into account such as Gaussian noise, channel state information, a channel noise profile, encoding method and similar signal input parameters. It will be appreciated that conditions associated with ideal transmission and reception do not often occur in a physical deployment of a wireless communication system. A wireless communication network deployment typically suffers from unexpected noise, multipath and fast fading and other complex interference. As a result, it can be difficult, for example, to accurately know or estimate channel state information and similar. Furthermore, a receiver may not be aware of the encoding method used to transmit a signal and therefore providing a reliable and efficient method and apparatus to provide for signal demapping/demodulation is challenging.

NNs and machine learning have made it possible to provide method and apparatus with improved demapping and demodulation performance. In particular, within a given encoding method and associated demodulation regime, it is possible to provide example received signals relating to a known transmitted signal(s) as a training dataset to train a NN to perform efficient and effective demodulation within that regime.

It will be appreciated that a receiver may have an ability to receive a signal and demodulate according to a plurality of different available encoding and channel regimes. Furthermore, a receiver may include an ability to provide different receiver configurations and may, for example, include a plurality of different receiver hardware elements or configurations. In each case, a separate NN could be provided to allow for improved demodulation/demapping performance. In such an arrangement, it can become challenging to provide a mechanism for receiving apparatus to choose or select a most appropriate NN to apply to a received signal.

Arrangements described are directed to provision of an ability to embed different communication receivers or receiver settings (demapping mechanisms), implemented as NNs, within a set of parameters. Superposition of models within a set of weights has been suggested—B. Cheung, A. Terekhov, Y. Chen, P. Agrawal, and B. Olshausen. "*Superposition of many models into one*".arXiv preprint arXiv: 1902.05522, 2019. Arrangements described may provide for quantization of parameters used to change NN configuration. Such an approach can allow for a reduction in any memory requirement associated with the provision of a system which can provide a superposition of NN models and make switching between NNs trained for a plurality of outcomes practical. Without quantization, memory required to support superposed models may be as large as memory consumed by each of the multiple independent models, thus making the overall idea of superposition of a plurality of NNs questionable. According to a quantized approach, effectively a single NN may be configured to implement multiple receivers or different receiver configurations, themselves essentially a NN, those receivers or receiver configurations having been trained to share the same set of weights. In other words, the receivers (or receiver configurations) "learn" to use the same set of weights. Such an approach allows for implementation of superposed NN outcomes within achievable overall system hardware requirements.

Generally, arrangements may allow a NN to represent multiple receivers (or receiver configurations). Arrangements may achieve that as a result of provision of a NN in a receiver with an additional input. The additional input may be referred to throughout described arrangements as the "context". The context defines a context matrix which is used within the NN to enable a superposition of multiple models. By selecting the appropriate context matrix, the corresponding model can be selected during training and inference.

Arrangements recognise that it is required to store as many context matrices as there are receiver configurations. By quantizing context matrices it is possible to minimize memory requirements relating to storage of those context matrices, and to reduce computational complexity in relation to switching receiver configuration.

General Architecture

Figure 1A:
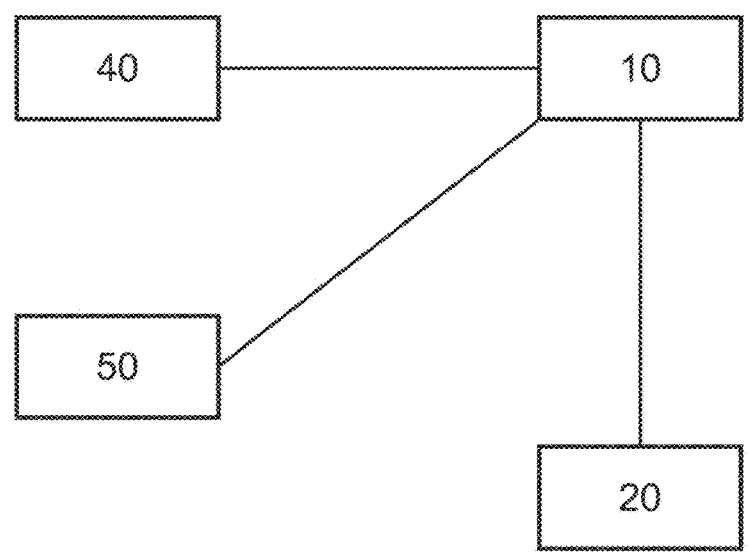
FIG. 1a illustrates general receiver architecture according to an arrangement.

FIG. 1a illustrates an arrangement of receiver apparatus according to one arrangement. A data processor 10 is provided which is coupled with receiver hardware 20. Signal data 40 is provided to the data processor 10, either in real time or from storage 50. The signal data may be provided from a variety of different sources in any of a number of different formats. The signal data may comprise any of a variety of different types of signal data.

Machine Learning Algorithm Architecture

Figure 1B:
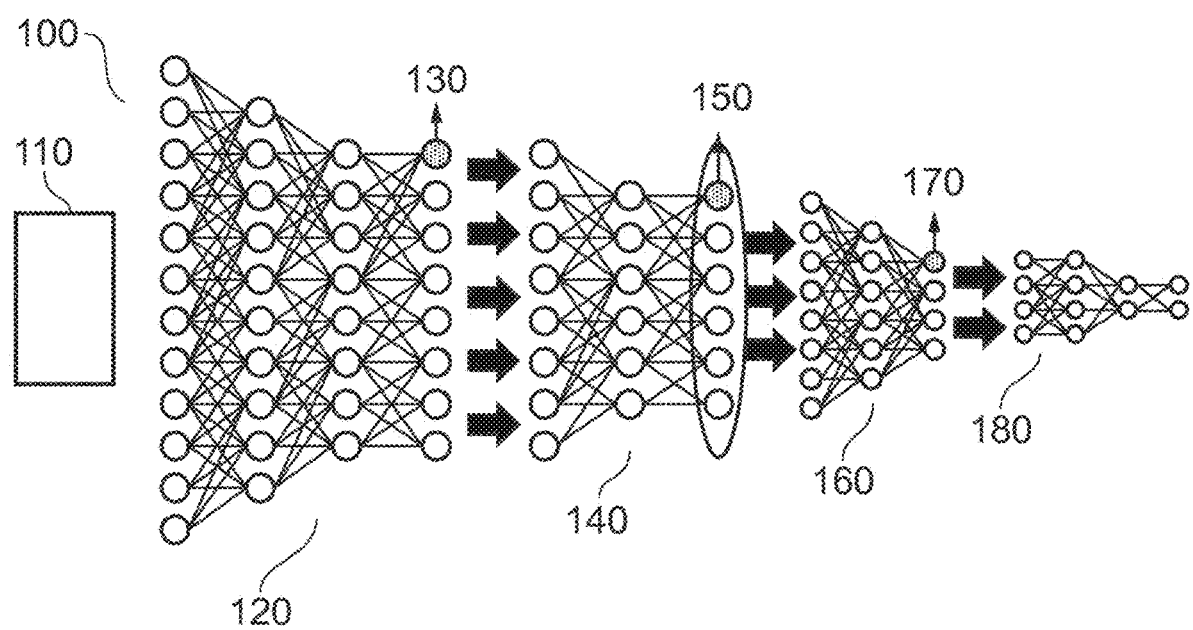

FIG. 1b illustrates schematically a typical outline of a neural network used to optimise operation of one receiver configuration. According to such a general arrangement a neural network (NN) or model executing on the data processor 10 can select settings for a given receiver configuration based on received signal data. FIG. 1b illustrates schematically a typical outline of a neural network used to select settings for a given receiver configuration. The network shown schematically in FIG. 1b is such that characteristics and parameters relating to a received signal enter on the left and the model created by the neural network is such that subsequent model layers generate more and more abstract features as parameters progress through the neural network.

In the example neural network too shown in FIG. 1b, a training dataset 110, in this instance, relating to received signals relating to known transmitted signal(s), can be provided. Input layer 120 of the neural network may operate to identify features 30 relating to the training dataset. "Hidden" layers 140, 160, operate to identify groupings of "features" 150, 170 respectively of the training dataset or features of the previous layers as the NN moves towards the output layer 180. Output layer 180 of the neural network may operate to identify particular optimum settings for a given receiver configuration, dependent upon an outcome which the neural network has been trained to recognise.

It will be appreciated that it may be beneficial to be able to input a signal and use features or parameters determinable from that signal to choose between various available receiver configurations, each of which may be associated with a separate NN to select particular optimum settings for the given receiver configuration. It will be further appreciated that some arrangements may provide a NN to select between NNs associated with each receiver configuration. Such arrangements are, however, computationally significant and may not represent best use of available hardware.

Some arrangements may recognise that it can be beneficial to quantize context matrices which map to different receiver configuration NNs to achieve optimal system performance. That superposition of receiver configuration NNs can be performed as a balance or compromise relating to the level of quantisation performed to select between the receiver configuration NNs. That is to say, in order to fully quantise selection between receiver configuration NNs (context matrices), performance of the receiver configuration NNs may be compromised, or to achieve better receiver configuration NN performance, quantisation of the different NNs relating to receiver configuration may be compromised. Arrangements provide a mechanism, within a given hardware regime, to make best use of the available computational resource and offer more than one NN relating to receiver configuration.

Arrangements may recognise that by providing context matrices (as described in more detail below) for each receiver configuration and aligning those context matrices with a simple codebook, it becomes more computationally efficient to perform a context (receiver configuration) switch.

Arrangements can be used to assist in how a decision regarding which receiver configuration to use is taken. Arrangements provide a mechanism that enables multiple receiver configurations to be efficiently constructed, stored and retrieved (quantized context matrices, superposition parameters, training algorithm). Logic which operates to decides which context (receiver configuration) to use at a receiver may be designed and run alongside the apparatus and method of various described arrangements.

It will be appreciated that an apparatus and training method according to some arrangements can be run before deployment in a wireless communication network, on powerful hardware (GPUs . . . ). Once training is complete, a neural network architecture appropriately trained could be implemented on a actual receiver, together with the determined superposed parameters and quantized context matrices, and an algorithm which is configured to assist with deciding which receiver configuration (context) to use at any given time according to some input (e.g., the channel state).

In use arrangements may be implemented such that a receiver configuration is selected in some way according to an input signal. Once selected, the corresponding context matrix is retrieved, the superposition parameters are combined with the selected context matrix to generate the contextual parameters, and finally the implemented NN parameters are updated with the so-generated contextual parameters.

Example Training of Superposed Receiver Configuration NNs

Throughout the description, the following notation will be used:

For a vector x, $x_i$ denotes its $i_{th}$ element, i.e., $x = [x_0, \ldots, x_{n-1}]$.

In one communication system in which a receiver is provided with NN capability, arrangements may be implemented to improve receiver operation.

One general arrangement relates to a receiver with K possible receiver configurations. Let $\mathcal{K} = \{1 \ldots K\}$ represent the set of possible receiver configurations.

The receiver is configured such that it aims to reconstruct a message s chosen from a finite set $M\_k = \{1 \ldots M\_k\}$, $k \in \mathcal{K}$, from a vector of received samples $y \in \mathcal{C}^n$, where n is the number of channel uses.

The receiver is assumed to be implemented as a function $f_{\theta_k}$ with a trainable vector of parameters $\theta_k$ which depends on a context k. The receiver is typically implemented as a NN.

The receiver maps vector of received samples $y \in \mathcal{C}^n$ to a probability vector p of dimension $M_k$, such that $p_i$ can be interpreted as the probability that the message $i \in \mathcal{M}_k$ was sent.

Context superposition operates such that for each receiver configuration $k \in \mathcal{K}$ a context matrix $C_k$ is defined. A combining operator $\odot$ is also defined, which can be implemented in various ways, for example, the combining operator could be the matrix or element-wise product. If an element-wise product is chosen, context matrices $C_k$ are vectors of same dimension as $\theta_k$.

According to some arrangements, one set of parameters is stored, denoted as $\bar{\theta}$, and which can be interpreted as the superposition of the parameters corresponding to the K receiver configurations. When the context $k \in \mathcal{K}$ is selected, the corresponding parameters $\theta_k$ is retrieved by combining the corresponding context matrix $C_k$ and $\bar{\theta}$ as follows:

$$\theta_k = \bar{\theta} \odot C_k$$

Figure 2:
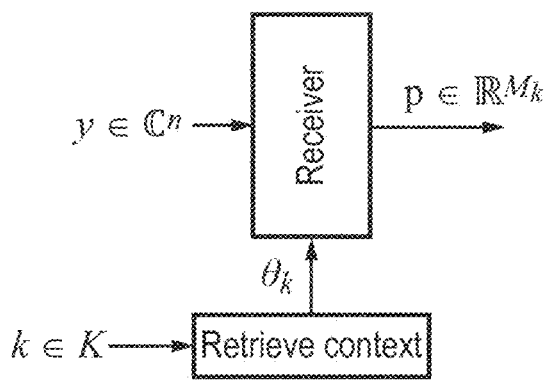
FIG. 2 illustrates schematically receiver operation using parameters specific to a selected context.

FIG. 2 illustrates schematically receiver operation using parameters specific to a selected context.

FIG. 3 comprises a visual representation of an inference flow-graph. FIG. 3 illustrates the steps of the following algorithm:

S1: Retrieve the contextual parameters $\theta_k$

S2: Infer the probability vector p from the received signal y using the parameters $\theta_k$

Quantization of the Context Matrices

Since arrangements require storage of K context matrices, one per receiver configuration, it will be appreciated that the amount of memory required to store the context matrices can quickly prevent practical use of more than a few contexts. Arrangements may recognise that quantisation of the context matrices $C_k$ can offer a reduction in required memory. According to some arrangements, elements of the context matrices are forced towards, or to match, values in a finite codebook $\mathcal{C}$. The values of the finite codebook may comprise, for example, {−1, 0,1}, or a set of powers of two. By forcing such a restriction, the amount of memory required to store context matrices can be greatly reduced. Moreover, use of a quantised codebook reduces the computational power required to retrieve configurations. For example, if a codebook $\mathcal{C}$ ={−1, 0,1} is chosen, then computing the element-wise product is reduced to a sign change.

Superposition of Neural Networks

Assuming the combining operator $\odot$ is differentiable (which is the case if it is chosen to be the matrix or element-wise product) then $\bar{\theta}$ and the context matrices $\{C_k\}_{k=1\ldots K}$ can be trained jointly. Training complexity can arise from the requirement to quantize the context matrices towards values in a pre-defined codebook $\mathcal{C}$.

One arrangement is such that the training algorithm follows an approach set out below:

T1: Initialize the context matrices $C_k$ for k=1 . . . K, e.g., randomly.

T2: Compute quantized context matrices $\tilde{c}_k = \Pi_\mathcal{C}(C_k)$ for k=1 . . . K, where $\Pi_\mathcal{C}$ is the projection operator on the codebook $\mathcal{C}$.

T3: Initialize the Lagrange coefficients $\lambda_k$, for k=1 . . . K, and penalty coefficients μ

T4: Initialize the parameters $\bar{\theta}$

T5: Update $\bar{\theta}$ and $C_1$ . . . $C_K$ by solving $$\bar{\theta}, C_1 \ldots C_K = \arg\min_{\theta, C_k}\left(L(\theta) + \frac{\mu}{2}\sum_{k=1}^{K}\left\|C_k - \tilde{c}_k - \frac{1}{\mu}\lambda_k\right\|^2\right)$$

where L is a loss function which measure the performance of the receiver, e.g., the categorical cross-entropy.

T6: Compute $\tilde{c}_k = \Pi_\mathcal{C}(C_k)$ for k=1 . . . K

T7: Update the Lagrange coefficients as: $\lambda_k = \lambda_k - \mu(C_k - \tilde{c}_k)$ T8: Increase μ according to a predefined schedule.

T9: Stop if $\Sigma_{k=1}^{K}\|C_k - \tilde{c}_k\|^2$ is small enough or repeat from step 4.

FIG. 4 comprises a flow-graph of a training procedure according to an arrangement such as that outlines above. The step 5 can usually not be solved exactly, but can be solved approximately using stochastic gradient descent or a variant. The steps 2 and 6 are simply solved by choosing for each element of the context matrices the closest in the pre-defined codebook.

FIG. 4 illustrates a method according to which a system operates to jointly and simultaneously train a receiver demapper and the quantize the context matrices. The method of the arrangement in FIG. 4 operates such that the training begins by seeking the best possible demapping performance in relation to each receiver configuration, having a low value of μ. The best possible demapping performance may, however, not offer good quantisation/match a selected codebook, and so a stepwise training is performed in which the value of μ is increased. As the μ value increases the training becomes more focused upon quantisation of context matrices rather than reconstruction of transmitted messages. A method in accordance with the arrangement described in FIG. 4 seeks to find a compromise between demapping performance and quantisation, given a selected codebook. It will be appreciated that choice of codebook, for example, choice of codebook size, can be a factor in determining how to quantize or "superpose" the various context matrices which map to a particular receiver configuration, given a set of input parameters.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   a processor configured to cause the apparatus to
      quantize a plurality of receiver configurations,
      determine a plurality of available receiver configurations and associate each receiver configuration with a context matrix,
      select a quantisation codebook to be used for the context matrices,
      learn from a training dataset comprising a plurality of received signal samples relevant to reconstruction of a transmitted message,
      generate, from the training dataset, a set of superposed parameters and context matrices corresponding to the plurality of available receiver configurations and a set of contextual parameters for each context matrix, the contextual parameters being generated from the set of superposed parameters by combination with the context matrix associated with each receiver configuration, quantize the context matrices according to the quantisation codebook, and repeat the generation of superposed parameters, context matrices and quantization of context matrices until a stop criterion is met.

2. The apparatus according to claim 1, wherein the stopping criterion comprises one or more of a predefined number of iterations, or meeting a predetermined performance metric.

3. The apparatus according to claim 1, wherein the stopping criterion relates to a performance metric associated with the reconstruction of the transmitted message.

4. The apparatus according to claim 1, wherein the stopping criterion relates to a performance metric associated with quantizing the context matrices according to the quantisation codebook.

5. The apparatus according to claim 1, wherein the processor is further configured to cause the apparatus to select the quantisation codebook by setting coefficients of the context matrices to match values of a finite matrix codebook.

6. The apparatus according to claim 5, wherein the finite matrix codebook comprises one of {−1, 0, 1}, or values which are powers of two.

7. The apparatus according to claim 1, wherein the processing is further configured to cause the apparatus to combine the superposed parameters with the context matrix by one of matrix multiplication or element-wise product.

8. The apparatus according to claim 1, wherein the receiver configurations comprise one or more of a receiver or a demodulation configuration.

9. A device comprising:

receiver configured to receive a wireless communication signal; and the apparatus according to claim 1 wherein the processor is further configured to cause apparatus to process the received wireless communication signal and demap the received signal.

10. The device according to claim 9, wherein the processor is further configured to cause the apparatus to select a receiver configuration from said plurality of receiver configurations to apply to said received wireless communication signal, based upon one or more factors including said generated superposed parameters and quantized context matrices.

11. A method comprising:

quantising a plurality of receiver configurations by:

determining a plurality of available receiver configurations and associating each receiver configuration with a context matrix;

selecting a quantisation codebook to be used for the context matrices;

providing a training dataset comprising a plurality of received signal samples relevant to reconstruction of a transmitted message;

generating, from the training dataset, a set of superposed parameters and context matrices corresponding to the plurality of available receiver configurations and a set of contextual parameters for each context matrix, the contextual parameters being generatable from the set of superposed parameters by combination with the context matrix associated with each receiver configuration;

quantizing the context matrices according to the quantisation codebook; and repeating the generating of superposed parameters, context matrices and quantisation of context matrices until a stop criterion is met.

12. A non transitory computer readable medium storing instructions, which when executed by a processor, cause an apparatus including the processor to perform the method of claim 11.

13. The method of claim 11, wherein the stop criterion comprises one or more of a number of iterations, or meeting a performance metric.

14. The method of claim 11, wherein the stop criterion relates to a performance metric associated with the reconstruction of the transmitted message.

15. The method of claim 11, wherein the stop criterion relates to a performance metric associated with quantizing the context matrices according to the quantisation codebook.

16. The method of claim 11, wherein the selecting the quantisation codebook includes setting coefficients of the context matrices to match values of a finite matrix codebook.

17. The method of claim 16, wherein the finite matrix codebook comprises one of {−1, 0, 1}, or values which are powers of two.

18. The method of claim 11, wherein the generating the superposed parameters, context matrices, and quantisation of context matrices includes combining the superposed parameters with the context matrix by one of matrix multiplication or element-wise product.

19. The method of claim 11, wherein the plurality of receiver configurations comprise one or more of a receiver or a demodulation configuration.

20. The method of claim 11, further comprising:

receiving, via a receiver, a wireless communication signal; and processing the received wireless communication signal and demapping the received signal.

* * * * *